(12) United States Patent
Burk

(10) Patent No.: US 10,203,137 B2
(45) Date of Patent: Feb. 12, 2019

(54) SORPTION MODULE

(71) Applicant: Mahle International GmbH, Stuttgart (DE)

(72) Inventor: Roland Burk, Stuttgart (DE)

(73) Assignee: Mahle International GmbH (DE)

( * ) Notice: Subject to any disclaimer, the term of this patent is extended or adjusted under 35 U.S.C. 154(b) by 16 days.

(21) Appl. No.: 15/534,476

(22) PCT Filed: Nov. 30, 2015

(86) PCT No.: PCT/EP2015/078002
§ 371 (c)(1),
(2) Date: Jun. 8, 2017

(87) PCT Pub. No.: WO2016/091627
PCT Pub. Date: Jun. 16, 2016

(65) Prior Publication Data
US 2017/0328607 A1    Nov. 16, 2017

(30) Foreign Application Priority Data

Dec. 10, 2014  (DE) .......................... 10 2014 225 411

(51) Int. Cl.
*F25B 17/08* (2006.01)
*F25B 17/06* (2006.01)
(Continued)

(52) U.S. Cl.
CPC .............. *F25B 17/08* (2013.01); *F25B 17/06* (2013.01); *F25B 35/04* (2013.01); *F25B 37/00* (2013.01);
(Continued)

(58) Field of Classification Search
CPC .......... F25B 17/00; F25B 17/02; F25B 17/08; F25B 17/06; F25B 35/04; F25B 37/04;
(Continued)

(56) References Cited

U.S. PATENT DOCUMENTS 4,205,531 A  *  6/1980  Brunberg ............... C09K 5/047
                                                            62/101
4,517,182 A     5/1985  Cheng
(Continued)

FOREIGN PATENT DOCUMENTS

AT           410841 B       8/2003
DE        10016352 A1      10/2001
(Continued)

OTHER PUBLICATIONS

English abstract for DE-102004049411.
(Continued)

*Primary Examiner* — Melvin Jones
(74) *Attorney, Agent, or Firm* — Fishman Stewart PLLC

(57) ABSTRACT

A sorption module may include a housing enclosing a working chamber including a sorption zone and a phase change zone arranged therein. The sorption module may also include a sorption structure, which may be arranged in the sorption zone and coupled in a heat-transmitting manner to a sorption path for guiding a sorption path medium, and a phase change structure, which may be arranged in the phase change zone and coupled in a heat-transmitting manner to a phase change path for guiding a phase change path medium. The sorption module may further include a control device configured to control a fluidic connection through which a working medium may be reversibly displaceable between the sorption zone and the phase change zone. The control device may include an actuator configured to control the fluidic connection depending on an adjustment of the actuator and an actuating drive configured to adjust the actuator.

20 Claims, 5 Drawing Sheets

(51) Int. Cl.
*F25B 35/04* (2006.01)
*F25B 37/00* (2006.01)
*F25B 39/00* (2006.01)
*F25B 49/04* (2006.01)
*F25B 39/02* (2006.01)

(52) U.S. Cl.
CPC ............ F25B 39/00 (2013.01); F25B 49/046 (2013.01); *F25B 39/026* (2013.01); *Y02A 30/276* (2018.01)

(58) Field of Classification Search
CPC ........ F25B 37/00; F25B 39/00; F25B 39/026; F25B 49/04; F25B 39/02; Y02B 30/62
USPC .................................. 62/101, 479, 486, 489
See application file for complete search history.

(56) References Cited

U.S. PATENT DOCUMENTS

| | | | |
|---|---|---|---|
| 5,518,069 A | 5/1996 | Maier-Laxhuber et al. | |
| 6,378,326 B2 | 4/2002 | Maier-Laxhuber et al. | |
| 6,412,295 B2 | 7/2002 | Weiss et al. | |
| 6,820,441 B2 * | 11/2004 | Maier-Laxhuber | F25B 17/08 62/477 |
| 7,213,403 B2 | 5/2007 | Maier-Laxhuber et al. | |
| 7,581,698 B2 * | 9/2009 | Hoehne | B64D 11/02 165/104.12 |
| 9,109,808 B2 * | 8/2015 | Gerber | F24F 3/1417 |
| 2004/0211215 A1 | 10/2004 | Maier-Laxhuber et al. | |

FOREIGN PATENT DOCUMENTS

| | | |
|---|---|---|
| DE | 10303292 A1 | 7/2004 |
| DE | 102004049411 A1 | 4/2006 |
| DE | 102007047454 A1 | 4/2009 |
| EP | 127028 A2 | 12/1984 |
| EP | 0527466 A1 | 2/1993 |
| EP | 1162415 A1 | 12/2001 |
| EP | 1443288 A2 | 8/2004 |
| EP | 1645819 A1 | 4/2006 |
| EP | 2447624 A2 | 5/2012 |
| WO | WO-2007/068481 A1 | 6/2007 |
| WO | WO-2013011102 A2 | 1/2013 |

OTHER PUBLICATIONS

English abstract for DE-102007047454.
English abstract for AT-410841.
English abstract for EP-1645819.
English abstract for EP-2447624.

* cited by examiner

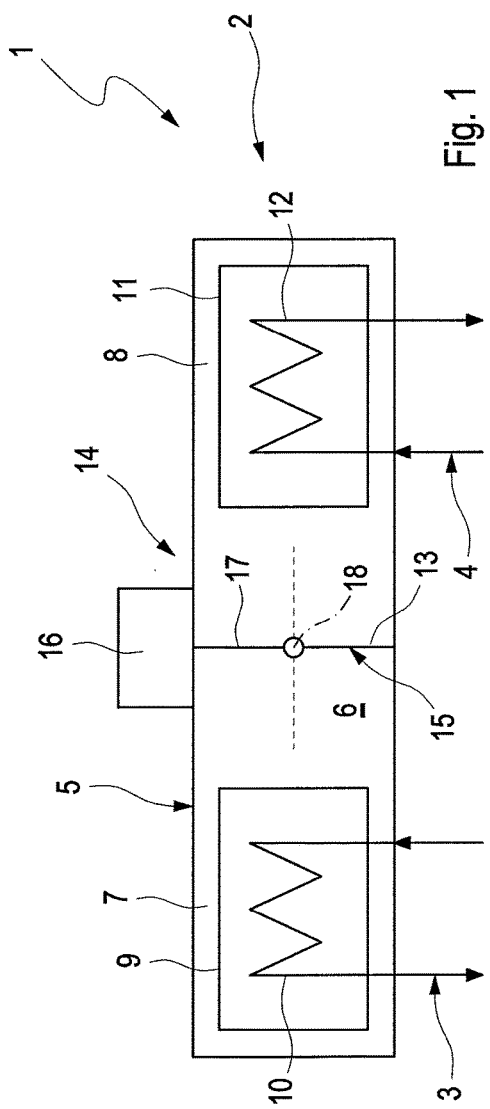
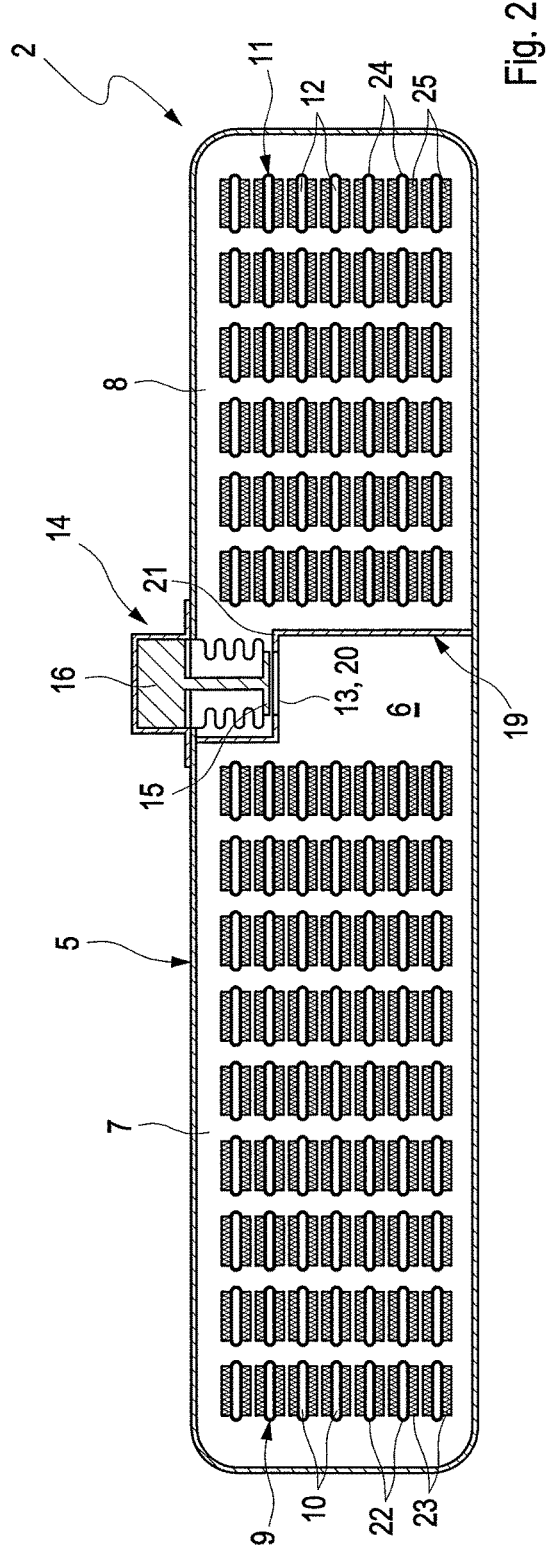

SORPTION MODULE

CROSS-REFERENCE TO RELATED APPLICATIONS

This application claims priority to German Patent Application No. DE 10 2014 225 411.6, filed on Dec. 10, 2014, and International Patent Application No. PCT/EP2015/078002, filed on Nov. 30, 2015, both of which are hereby incorporated by reference in their entirety.

TECHNICAL FIELD

The present invention relates to a sorption module for a sorption temperature-control device. The invention additionally relates to a sorption temperature-control device fitted with at least one such sorption module.

BACKGROUND

A generic sorption module is known from WO 2013/011102 A2 and comprises a housing which encloses a working chamber. A sorption zone and a phase change zone are located in the working chamber. Furthermore, in the working chamber a working medium is reversibly displaceable between the sorption zone and the phase change zone. Located in the sorption zone is a sorption structure which is coupled to a sorption path for guiding a sorption medium in a heat-transmitting manner. Located in the phase change zone on the other hand is a phase change structure which is coupled to a phase change path for guiding a phase change path medium in a heat-transmitting manner.

Known from WO 2007/068481 A1 is another sorption module which has a fundamentally different structure. It comprises a plurality of hollow bodies which are arranged parallel to one another and form a hollow body block. A sorption zone with sorption structure and a phase change zone with phase change structure is formed in each hollow body, wherein each hollow body contains a correspondingly small quantity of working medium which is reversibly displaceable between the sorption zone and the phase change zone. A common sorption path is connected in a heat-transmitting manner to the sorption zones of all the hollow bodies whereas a common phase change path is connected to the phase change zones of all the hollow bodies in a heat-transmitting manner.

A sorption module or a sorption temperature-control device which is fitted with one such sorption module can be used for heating or for cooling depending on the application according to whether the application has the aim of cooling a heat source or heating a heat sink. Cases of application are also feasible in which heating and cooling can take place at the same time. In the present context the term "temperature controlling" is therefore to be understood as "cooling and/or heating". The mode of operation of such a sorption temperature-control device requires the presence of a heat source when cooling is to take place and the presence of a heat sink when heating is to take place.

However, a problem in many such applications is that both the supply and demand for heat and/or cold frequently differ in time, wherein optionally at the same time the temperature level of available heat sources is lower than the temperature level of available heat sinks. It is also feasible that the heating power or cooling power which can be delivered by the sorption temperature-control device differs substantially from the heating power (heat source) or cooling power (heat sink) available for operation of the sorption temperature-control device. A device is therefore sought which is capable of shifting temporally and spatially a heating and/or cooling power between different heat sources and heat sinks, and also of raising heat, contrary to the natural trend of nature, from a lower temperature level to a higher temperature level (heat pump).

There is therefore great interest in being able to use the respective sorption module depending on the application as a cold storage device or as a heat storage device in order to be able to be able to release the stored heat or cold at any arbitrary time, possibly also with a changed temperature level. In principle, for this purpose it is possible to configure the sorption path and/or the phase change path as controllable with the aid of corresponding control devices. For example, any heat and material exchange can be prevented by blocking the respective path. However the expenditure on apparatus for this purpose is comparatively high. Furthermore, for this purpose the respective sorption module must be fitted with an efficient thermal insulation, in particular with respect to the surroundings. Furthermore, no heat pump effect is possible with such a concept.

SUMMARY

The present invention is concerned with the problem of providing an improved embodiment for a sorption module of the type mentioned initially or for a sorption temperature-control device fitted therewith, which is in particular characterized in that it enables efficient use of the sorption module as a heat storage device and/or cold storage device and/or as a heat pump and thereby has a comparatively simple structure which can be implemented relatively cheaply.

This problem is solved according to the invention by the subject matter of the independent claims. Advantageous embodiments are the subject matter of the dependent claims.

The invention is based on the general idea to configure the sorption module so that the displacement of the working medium can be controlled directly. In detail it is proposed to control a fluidic connection through which the working medium is reversibly displaceable between the sorption zone and the phase change zone for which a corresponding control device is provided. The fluidic connection can be controlled with the aid of the control device at least for opening and for closing. When the fluidic connection is open, the working medium can be displaced unhindered between the sorption zone and the phase change medium. When the fluidic connection is closed on the other hand, the working medium can no longer be displaced between sorption zone and phase change zone. A charging process of the device which can be used as heat and/or cold storage device is accomplished by heating the sorption zone whereby the stored working medium is desorbed by supplying heat from the sorption structure. As a result of the different pressures within the working chamber, when the fluidic connection is open, the vaporous working medium can be displaced from the sorption zone to the phase change zone. There the working medium is condensed with the aid of the phase change structure and stored therein in liquid form. The released heat of condensation can be used or also discharged unused to the surroundings. As soon as the entire working medium is stored in the phase change structure, this state can be converted or frozen by closing the fluidic connection. The thermal energy stored in the sorption zone and "cold energy" stored in the phase change zone can then be retrieved at any time by opening the fluidic connection. According to the case of application, therefore by opening the fluidic connection, the adsorption heat released in the sorption zone can be supplied to a heat sink to be heated or the heat removed from the phase change zone can be used for cooling a heat source. In this case, the heat source can have a lower temperature level than the heat sink.

The sorption module presented here or the sorption temperature-control device fitted therewith has a particularly high attractiveness if there is simultaneously a heating requirement for a heat sink and a cooling requirement for a heat source and if in addition, the temperature level of the heat source to be cooled is lower than the heat sink to be heated when therefore a natural passive displacement of heat is not possible. In other words, the sorption temperature-control device operates as a heat pump in this case.

In the present context, the respective sorption structure is expediently provided additionally or separately to a wall which delimits the sorption zone and on which the sorption structure can be arranged. In the present context, the respective phase change structure is expediently provided additionally or separately to a wall which delimits the phase change zone and on which the phase change structure can be arranged.

According to an advantageous embodiment, a partition can be provided in the housing which fluidically separates the sorption zone from the phase change zone. The fluidic connection through which the working medium is reversibly displaceable between the sorption zone and the phase change zone can now be formed by at least one connecting opening which is formed in the partition. This connecting opening can then be controlled by said control device in such a manner that the respective connecting opening can be adjusted by means of the control device at least between an open state (open position) and a closed state (closed position). The integration of such a partition in the housing can be implemented particularly simply and inexpensively. With this design, the controllable fluidic connection is then achieved within the housing or in the working chamber with the result that the structure is overall relatively compact. Alternatively an embodiment is fundamentally also feasible in which the fluidic connection is achieved by means of a special channel which leads from the sorption zone to the phase change zone. Such a channel can be controlled particularly easily and at the same time moved inside and/or outside the housing but requires an increased structural and constructive expenditure.

According to another advantageous embodiment, the control device can comprise an actuator and an actuating drive for adjusting the actuator. The actuating drive can in principle be of any nature. It can operate in particular electrically, electromagnetically, pneumatically or hydraulically. The actuator cooperates with the fluidic connection and specifically in such a manner that the actuator controls the fluidic connection depending on its adjustment. In other words, the actuating drive adjusts the actuator for controlling the fluidic connection. As a result, the control device has a simple structure so that it can be implemented inexpensively and has a high reliability.

According to a further development, the actuator can be configured as a valve which is fitted with an adjustable valve member for controlling the fluidic connection. As a result, the actuator also has a very simple structure which makes it inexpensive to implement and reliable to operate.

In another further development, the valve member can cooperate with a valve seat which is provided in the aforesaid partition and which borders the respective connecting opening. By this means, an efficient closing function can be achieved for the valve member and for the connecting opening. In particular, valve member and valve seat can be specifically matched to one another so that, for example, as a result of a conical shape, when the connecting opening closes, an automatic centering of the valve member in the valve seat takes place. The valve member and the valve seat are expediently configured to be circular or rotationally symmetrical so that the closed position can be set with a high reliability.

In another further development, the valve can be configured as an overpressure opening valve which is constructed and arranged so that, when the fluidic connection is closed, it opens the fluidic connection above a pre-determined overpressure in the sorption zone relative to the phase change zone. This measure can avoid an excessive pressure rise in the sorption zone which can occur, for example, when during the charging process, i.e. during heating of the sorption zone the valve should close the fluidic connection. If on the other hand during cooling of the sorption module, the valve should close the fluidic connection, the excess pressure then formed in the phase change zone relative to the sorption zone then has the result that the valve member more strongly closes the fluidic connection or is pressed more strongly against the valve seat. However this is harmless compared to the aforesaid reverse case but only contributes to an increase in its tightness.

According to a further development, the overpressure opening valve can have a coupling element which is adjustable by means of the actuating drive and which is coupled to the valve member by means of a pre-tensioning spring. This means that the valve member is adjustable relative to the coupling element against the pre-tensioning force of the pre-tensioning spring even when the coupling element is held firmly by the actuating drive and cannot be adjusted itself.

The overpressure opening function can alternatively be accomplished by a special shaping of an elastic seal which seals in the case of a pressure difference from outside to inside and lifts from the valve seat due to elastic deformation in the case of a pressure difference from inside to outside.

In another embodiment, the actuating drive can be attached to an outer wall of the housing on the outside, wherein the actuator passes through a through-opening formed in the outer wall and cooperates with the fluidic connection in the working chamber. As a result of this design, the actuating drive can be attached as it were at any suitable place on the outside of the housing, with the result that it is easily accessible, for example, for maintenance purposes. In particular, the working chamber need not be opened for maintenance of the control device whereby working medium could escape and/or external gases, e.g. air could enter.

In a further development, an elastic membrane can be provided for sealing the through-opening with respect to the working chamber which membrane on the one hand is connected tightly to the actuator and on the other hand is connected tightly to the outer wall. As a result of the elasticity of this membrane, the membrane can follow the adjusting movements of the actuator so that in each relative position of the actuator the desired sealing of the through-opening is ensured. With the aid of this membrane, any leakage of the working medium through the housing into the surroundings of the housing and/or any leakage of an external gas such as, for example, air from the surroundings into the housing can be largely, preferably completely, avoided. The membrane can be configured to be flat. Likewise the membrane can be configured as a bellows. Advantageously the membrane or the bellows is made of a comparatively thin metal sheet which has a corresponding mobility or elasticity with the aid of a corrugated structure or bead structure.

In another embodiment, the housing can be configured to be cuboid wherein the sorption zone and the phase change zone are then arranged adjacent to one another in the housing. The term "adjacent to one another" in this case covers horizontally adjacent to one another as well as vertically adjacent to one another or above one another. The aforesaid partition is now arranged between the sorption zone and the phase change zone. In this case, the partition inside the housing forms an intermediate floor which connects a first section of an outer wall of the housing with a second section of the outer wall which lies opposite the first section.

In a further development, the partition can have a step in which the at least one connecting opening is arranged. In particular, the aforesaid valve seat can be arranged in this step. Accommodating the connecting opening in the step simplifies the arrangement of the control device. This can be arranged, for example, in a section of the outer wall of the housing opposite the step.

In an alternative embodiment, the housing can be configured to be cylindrical, so that it has a longitudinal central axis and a jacket running around in the circumferential direction in relation to this longitudinal central axis. The phase change zone and the sorption zone are, for example, arranged concentrically, inside one another, wherein the sorption zone is arranged inside the phase change zone so that the phase change zone encloses the sorption zone in an annular manner in the circumferential direction of the housing. The aforesaid partition is then configured as a cylindrical sleeve, i.e., to be annular and extends radially between the sorption zone and the phase change zone. With the cylindrical design of the housing, in particular manufacturing costs can be reduced for the sorption module.

In a further development a jacket of the cylindrical housing extending in the circumferential direction of the housing can be configured to be double-walled and hollow-walled. This can be achieved, for example, whereby the jacket has an outer wall exposed to the surroundings of the housing and an inner wall exposed to the working chamber which are spaced apart from one another in such a manner that a cavity is formed between inner wall and outer wall. Spacer elements can be provided for stabilizing the jacket by means of which inner wall and outer wall are supported on one another. In particular, these spacer elements can be formed integrally on the inner wall or on the outer wall, for example, in the form of corresponding imprints. The phase change path is now expediently guided through the hollow jacket. In this way, the hollow jacket is integrated in the phase change path so that during operation of the sorption module phase change path medium also flows through the jacket. As a result of this measure, the jacket or the housing acquires an additional function in the form of the capacity to directly supply or remove heat through a heat transfer fluid. In order to increase the heat transfer between the phase change path medium and the phase change structure, the cavity between inner and outer jacket can be filled with a supporting and area-increasing rib structure which is connected to the inner wall in a heat-conducting manner.

In another further development, the phase change structure can be in contact in a heat-transmitting manner with an inner side of the jacket facing the working chamber. As a result, a heat-transmitting coupling is achieved between the phase change structure and the jacket and thus with the phase change path, which considerably simplifies the structure of the phase change structure. Furthermore, the working medium deposited as a result of condensation can be completely received by the phase change structure, wherein the entire heat of condensation formed in the sorption module can be received by the heat transfer fluid.

Expediently the phase change structure can now be radially at a distance from the cylindrical partition. As a result, the gaseous working medium can be distributed particularly simply over the entire phase change structure. In addition, a heat inflow, in particular due to thermal irradiation from the interior hotter sorption zone to the exterior phase change structure via the partition can be avoided in this way.

Furthermore, according to an advantageous embodiment it can be provided to pre-tension the phase change structure with the aid of at least one spring element against the inner side of the jacket. Such a pre-tensioned contact improves the heat transmission due to heat conduction. The contact between phase change structure and jacket is expediently direct and in particular firmly bonded but can be improved with the aid of a heat-conducting material, in particular a heat-conducting paste, a heat-conducting adhesive or a soft solder or the like.

A sorption temperature-control device according to the invention is fitted with at least one sorption module of the type specified previously. Preferably however, two or more such sorption modules are provided in the respective sorption temperature-control device. In addition, the sorption temperature-control device comprises at least one sorption circuit in which the sorption path medium circulates and in which the sorption path of the respective sorption module is incorporated.

In addition, at least one phase change circuit is provided in which the phase change path medium circulates and in which the phase change path of the respective sorption module is incorporated.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically

FIG. 1 shows a highly simplified, circuit-diagram-like schematic diagram of a sorption module of a sorption temperature-control device with a storage functionality, FIG. 2 shows a cross-section through a first embodiment of a sorption module with storage functionality.

DETAILED DESCRIPTION

Figure 3:
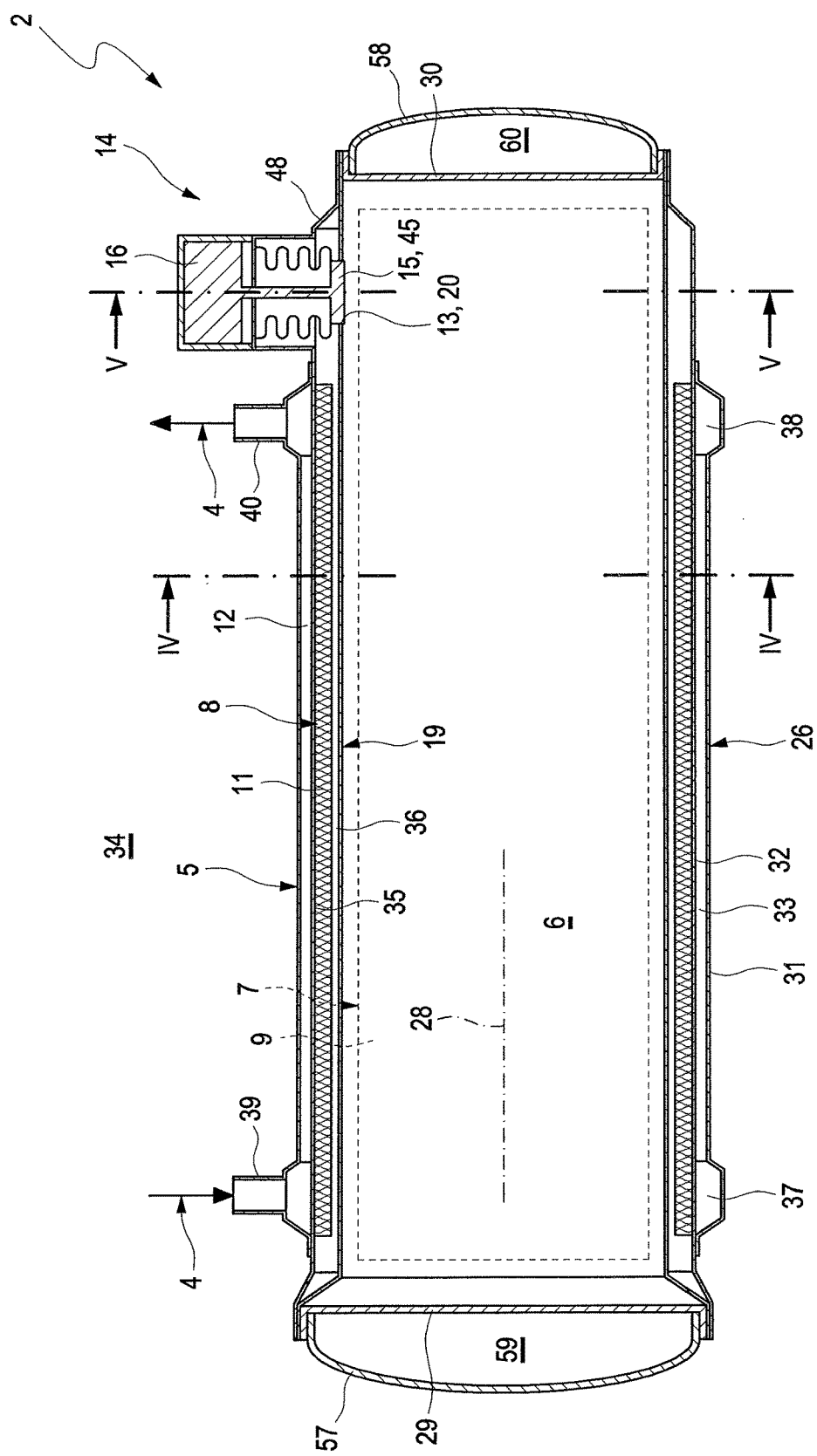
FIG. 3 shows a longitudinal section of the sorption module but in a different embodiment.

According to FIG. 1, a sorption temperature-control device 1 comprises at least one sorption module 2, a sorption circuit 3 and a phase change circuit 4. In the example of FIG. 1 the sorption temperature-control device 1 has only a single sorption module 2. In other embodiments the sorption temperature-control device 1 can also have two or more such sorption modules 2 which can be connected in series or in parallel. Also it is feasible that the sorption modules 2 are individually controllable within the sorption temperature-control device 1. The controllability of the sorption modules 2 can initially be accomplished in the sense that the sorption circuits 3 and/or the phase change circuits 4 are connected via switchover valves not shown according to a selectable algorithm simultaneously or successively to heat sources or heat sinks of suitable temperature levels in order to heat or cool these. An additional possibility for control according to the invention in order to achieve a heat or cold storage functionality will be explained further below.

The respective sorption module 2 according to FIGS. 1-9 has a housing 5 in each case which encloses a working chamber 6. A sorption zone 7 and a phase change zone 8 are located in the working chamber 6. In addition, a working medium not shown in detail here is located in the working chamber 6, which working medium is reversibly displaceable between the sorption zone 7 and the phase change zone 8. A sorption structure 9 is arranged in the sorption zone 7. This is coupled in a heat-transmitting manner to a sorption path 10 which guides a sorption path medium not shown. The sorption path 10 is incorporated in the sorption circuit 3. The sorption path medium circulates in the sorption path 3. A phase change structure 11 is arranged in the phase change zone 8 which is coupled to a phase change path 12 in a heat-transmitting manner. The phase change path 12 carries a phase change path medium, not shown, which circulates in the phase change circuit 4. The phase change path 12 is incorporated in the phase change circuit 4. The sorption path 10 and the phase change path 12 are guided through the housing 5 so that there is a fluidic separation between sorption path medium and working medium, between sorption path medium and phase change medium and between phase change path medium and working medium.

A fluidic connection 13 is provided for the reversible displacement of the working medium between the sorption zone 7 and the phase change zone 8, through which the working medium is reversibly displaceable between the sorption zone 7 and the phase change zone 8. The fluidic connection 13 is controllable by means of a control device 14 at least in such a manner that the fluidic connection 13 can be opened and closed with the aid of the control device 14. In principle, an embodiment is also feasible in which at least one intermediate state can be set. Expediently the control device 4 has an actuator 15 for controlling the fluidic connection 13 as well as an actuating drive 16 for adjusting the actuator 15. The actuator 15 cooperates with the fluidic connection 13 so that the actuator 15 controls the fluidic connection 13 depending on its adjustment, i.e. in particular opens or closes this.

In the simplified example of FIG. 1 the fluidic connection 13 is formed by a free cross-section of the housing 5 which lies between the sorption zone 7 and the phase change zone 8. The actuator 15 is here formed by a flap 17 which is arranged pivotably about a pivot axis 18 in the housing 5. The flap 17 is pivotable between a closed position shown by a continuous line and an open position shown by a broken line.

The fluidic connection 13 is expediently provided inside the housing 5, i.e. in the working chamber 6 whereby the sorption module 2 has a compact structure.

In the embodiments of FIGS. 2-5, a partition 19 is arranged in the housing 5 in such a manner that it brings about a fluidic separation between sorption zone 7 and phase change zone 8 in the working chamber 6. However, the partition 19 has at least one connecting opening 20 which forms the fluidic connection 13. The control device 14 is now configured so that it makes it possible to control this connecting opening 20, i.e. effects at least an opening and closing of the connecting opening 20.

In the embodiment shown in FIG. 2 the housing 5 is configured to be cuboid wherein the sorption zone 7 and the phase change zone 8 are then arranged adjacent to one another in the housing 5. The partition 19 is located between the sorption zone 7 and the phase change zone 8 and thereby interconnects opposite sections of the housing 5. In the example of FIG. 2, the partition 19 has a step 21 in which the respective connecting opening 20 is arranged. In this way, the coupling to the control device 14 is simplified, in particular when the step 21 runs parallel and proximal to a section of the housing 5 on which the actuating drive 16 is attached to the outside of the housing 5.

In the example in FIG. 2 the sorption path 10 is formed by a plurality of pipe pieces 22 through which the sorption path medium is guided and which are provided on their outer side with sorption material 23. As a result, the sorption path 10 is integrated in the sorption structure 9 which is formed by the sorption material 23. The phase change path 12 is here also formed by a plurality of pipe pieces 24 through which the phase change path medium is guided and which have a phase change material 25 on the outer side thereof. The phase change material 25 forms the phase change structure 11 in which the phase change path 12 is integrated.

Figure 4:
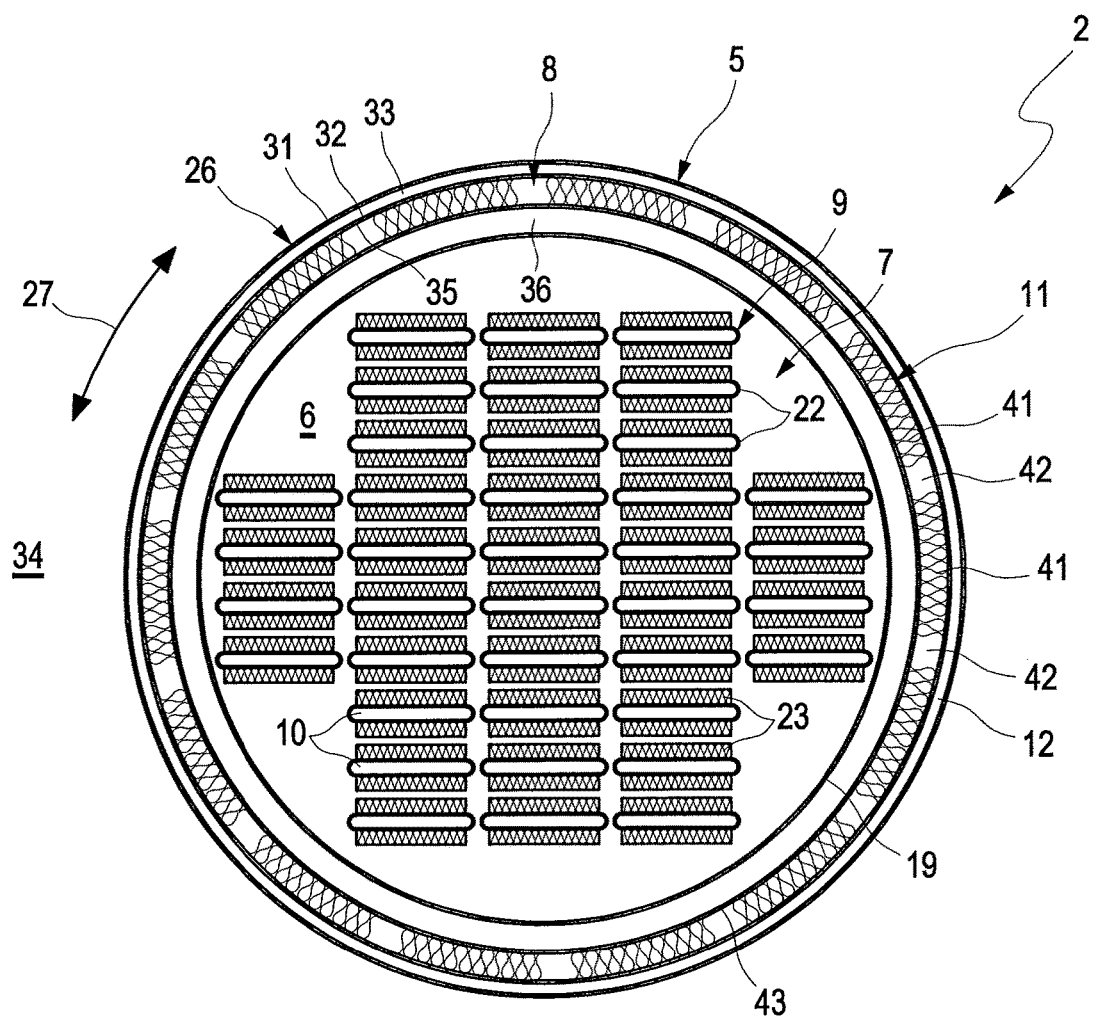
FIG. 4 shows a cross-section of the sorption module from FIG. 3 according to lines of intersection IV in FIG. 3.
Figure 5:
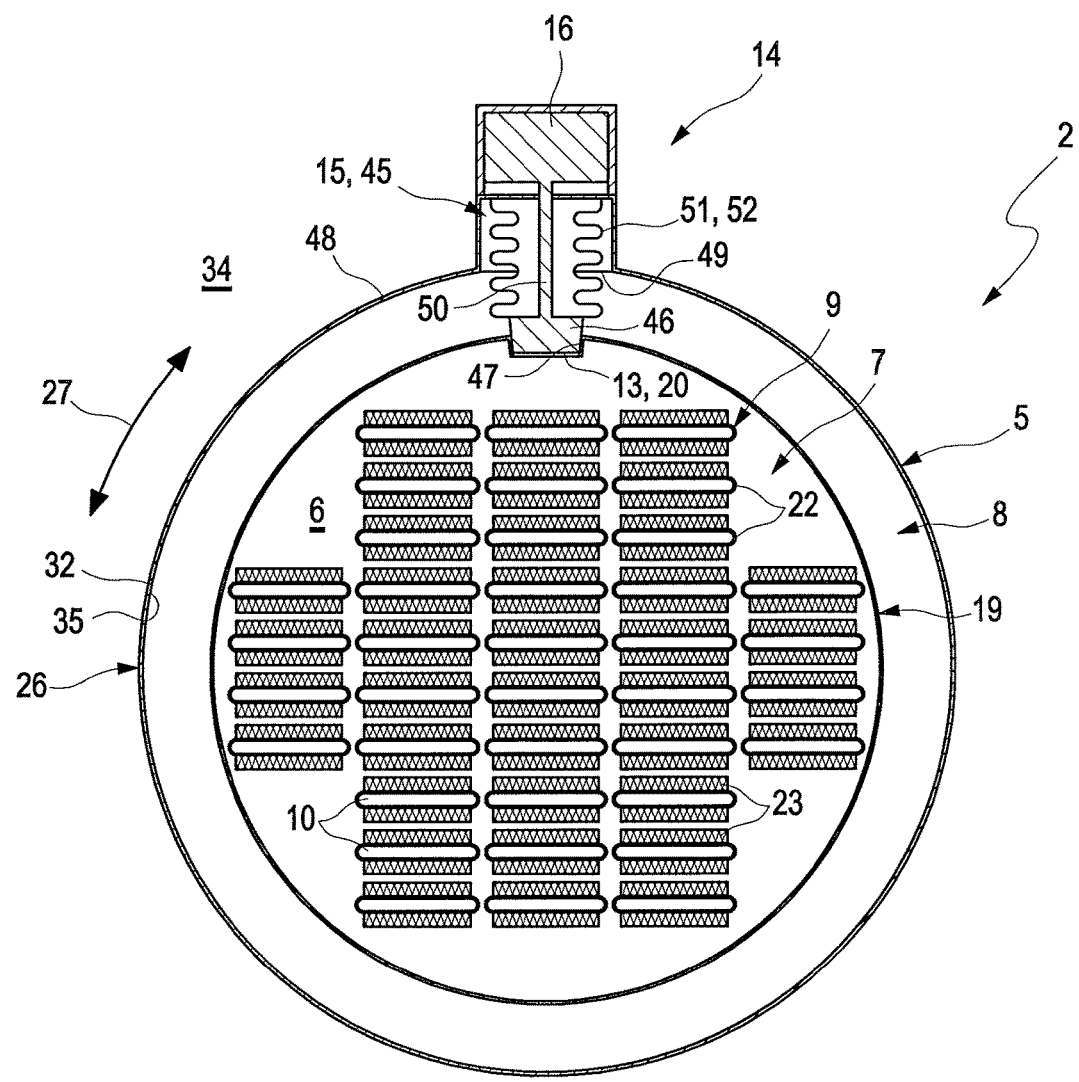
FIG. 5 shows a cross-section of the sorption module from FIG. 3 according to lines of intersection V in FIG. 3.
Figure 6:
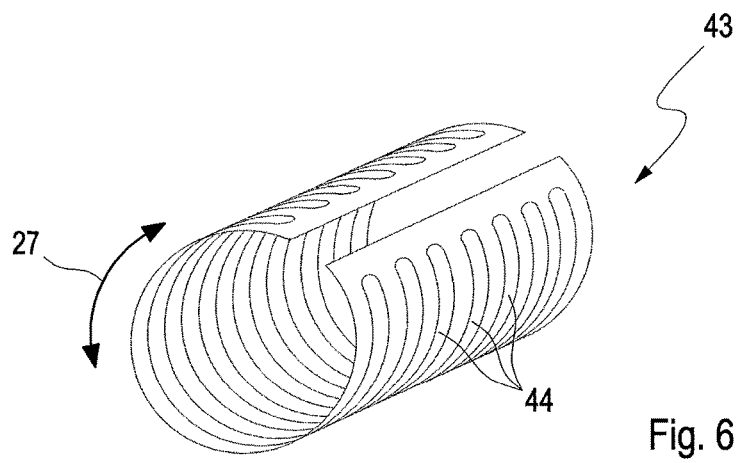
FIG. 6 shows an isometric view of a spring element of the sorption module from FIG. 3.

In the embodiment shown in FIGS. 3-5 the housing 5 is configured to be cylindrical so that it has a jacket 26 which extends in a closed manner in a circumferential direction 27 indicated by a double arrow in FIGS. 4 and 5 wherein the circumferential direction 27 relates to a longitudinal central axis 28 of the housing 5. The phase change zone 8 is arranged here so that it encloses the sorption zone 7 in the circumferential direction 27 in an annular manner. The partition 19 is for its part configured to be cylindrical and arranged in the housing 5 so that it extends radially between the sorption zone 7 and the phase change zone 8 in an annular manner. In the area of the axial end floors 29, 30 the tubular partition 19 is connected firmed and tightly to the housing 5. In the area of these end floors 29, 30 according to FIG. 3, end caps 57, 58 are additionally attached to the housing 5 by means of which chambers 59, 60 are formed in the housing 5 which are each open towards the longitudinal ends of the pipe bodies 22 so that these pipe bodies 22 open into the chambers 59, 60. For example, one chamber 59 forms a collecting chamber for collecting and removing the sorption path medium from the pipe bodies 22 whilst the other chamber 60 forms a distributor chamber for supplying and distributing the sorption path medium to the pipe bodies 22. The two chambers 59 and 60 have connecting pieces not shown here for supplying or removing the sorption path medium.

The embodiment of the sorption module 2 shown in FIGS. 3-5 additionally has another particular feature. According to FIGS. 3 and 4 the jacket 26 is configured to be double-walled and hollow-walled at least in a longitudinal section so that it has an outer wall 31 and an inner wall 32 which are radially spaced apart from one another and delimit a cylindrical cavity 33. The outer wall 31 is exposed to a surroundings 34 of the housing 5 whilst the inner wall 32 is exposed to the working chamber 6. The phase change path 12 is guided through the cavity 33 or through the hollow jacket 26. In this embodiment, the phase change structure 11 rests on an inner side 35 of the jacket 26 facing the working chamber 3 or the inner wall 32 and is connected to this in a heat-transmitting manner. In this case, the phase change structure 11 can be in direct contact with the inner wall 32. A contact via a heat-conducting material is also feasible. A firmly bonded connection is also feasible, e.g. by soft soldering. Furthermore, the phase change structure 11 is radially spaced apart from the partition 19 with the result that an intermediate space 36 is formed between the partition 19 and the phase change structure 11 through which the working medium can be supplied to or removed from the phase change structure 11. In this case, the phase change structure 11 is attached to the phase change path 12 which is here formed by the jacket 5 so that there is no integration as in the embodiment shown in FIG. 2.

The phase change path 12 here additionally has a distributor channel 37 integrated in the jacket 26 which runs around in a closed manner in the circumferential direction 27 and is axially open to the cavity 33. Furthermore a collecting channel 38 is formed in the jacket 26 which runs around in a closed manner in the circumferential direction 27 and is also axially open to the cavity 33. In the area of the distributor channel 37 a feed connection 39 is connected to the jacket 26 through which the phase change path medium is supplied. In the area of the collecting channel 38 on the other hand, a discharge connection 40 is provided on the jacket 26 through which the phase change path medium can be discharged.

The phase change structure 11 is expediently designed as a capillary structure so that it can retain condensed working medium. Such a capillary structure is known, for example, from EP 1 918 668 B1, the disclosure content of which is herewith added by reference in its full content to the present description.

As can be seen from FIGS. 4 and 5, in this embodiment the sorption structure 9 can have a similar structure to the embodiment shown in FIG. 2. Accordingly a plurality of pipe bodies 22 are provided here to which sorption material 23 is attached.

Expediently the phase change structure 11 according to FIG. 4 can be segmented in the circumferential direction 27 so that it comprises a plurality of strips 41 which each extend in the longitudinal direction of the housing 5 and are arranged adjacent to one another in the circumferential direction 27 In this case, respectively one gap 42 can be provided between neighbouring strips 41. The gap 42 is expediently dimensioned so that it can interrupt a capillary effect of the phase change structure 11. In the longitudinal direction of the housing a segmentation not shown here into smaller structure packets can also be advantageous in order to reduce or prevent runoff effects of stored working medium due to weight and/or acceleration forces. As a result, the homogeneous distribution of the working medium inside the phase change structure 11 is improved.

Furthermore, the phase change structure 11 can be pretensioned radially outwards towards the jacket 5 or towards the inner wall 32 with the aid of at least one spring element 43. By means of such a pre-stressed or pressed contact between phase change structure 11 and jacket 26, the heat transfer between phase change structure 11 and the jacket 26 serving as phase change path 12 can be improved. Such a spring element 43 is shown purely as an example in FIG. 6. It can be seen that this is designed in sheet metal form and cylindrically shaped with the result that it can be inserted particularly easily in the housing 5. Expediently the spring element 43 can at the same time serve as a support for the phase change structure 11 which simplifies the mounting of the sorption module 2. According to FIG. 6 the spring element 43 has a plurality of openings 44 whereby it is perforated and permeable for the working medium. Thus, the working medium can easily be displaced between the phase change structure 11 and the intermediate space 36 by the spring element 43.

With reference to FIGS. 5 and 7-9, particular configurations of the control device 14 are discussed in detail hereinafter which however can also be achieved in other configurations of the sorption module 2, i.e. not only in the embodiment shown in FIGS. 3-5 but also in the embodiment shown in FIG. 2 and in other embodiments not shown here as long as they are covered by the claims.

In the embodiments shown the control device 14 as mentioned comprises the actuating drive 16 and an actuator 15 which is adjustable with the aid of the actuating drive 16 and which cooperates with the respective connecting opening 20 in order to control this, i.e. in particular in order to open and close this. It is clear that in addition to an open position and a closed position, in principle arbitrary many intermediate positions can also be adjusted. The actuator 15 is expediently configured as valve 45 which has an adjustable valve member 46 with the aid of which the fluidic connection 13 or the connecting opening 20 can be controlled. In order to improve the efficiency of the valve 45, a valve seat 47 is provided which is formed on the partition 19 and which borders the respective connecting opening 20. In the embodiments shown, the valve member 46 and the valve seat 47 are configured conically whereby they have a self-centering effect which supports a reliable functioning of the valve 45.

In all embodiments the actuating drive 16 is attached on the outside to an outer wall 48 of the housing 5. In the example of FIG. 3 the outer wall 48 is formed in the area of the actuating drive 16 by the jacket 26 but outside the double-walled region which makes it easier to implement. This is because a through-opening 49 is provided in the outer wall 48 which is penetrated by the actuator 15 so that the actuator 15 can cooperate with the fluidic connection 13 in the working chamber 6. In detail, the actuator 15 or the valve 45 comprises for this purpose a coupling element 50 by means of which the actuating drive 16 is connected to the valve member 46. In so doing, the coupling element 50 passes through the through-opening 49 so that the valve member 46 can cooperate with the valve seat 47 in the working chamber 6 in order to control the connecting opening 20.

Figure 7:
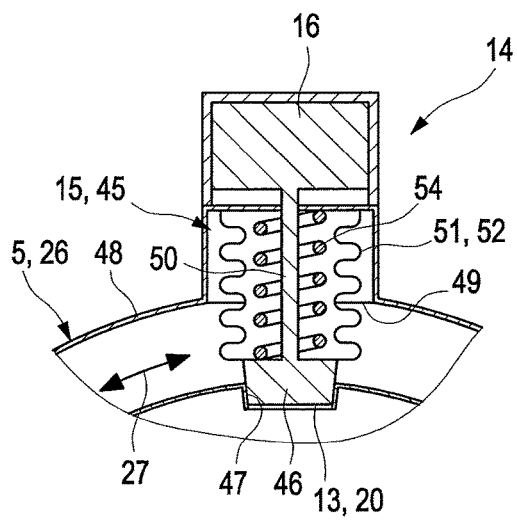
FIGS. 7 to 9 shows cross-sections of the sorption module as in FIG. 5 in the region of a control device but in different embodiments.
Figure 8:
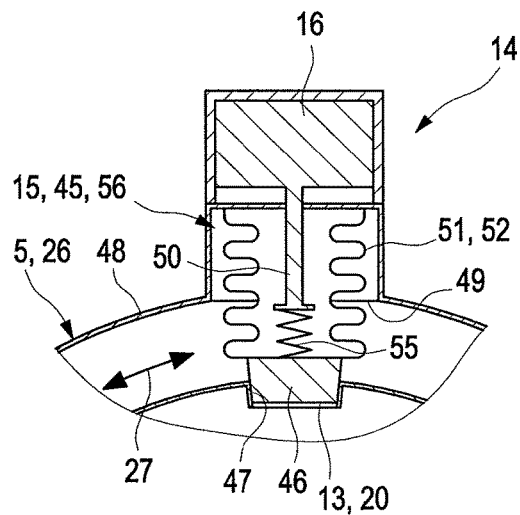
Figure 9:
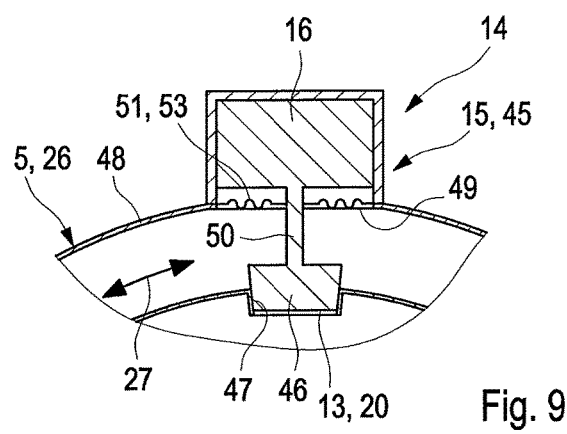

Furthermore, the control device 14 is fitted with a flexible and/or elastic membrane 51. This is on the one hand tightly connected to the actuator 15, here to the valve member 46, and on the other hand tightly connected to the outer wall 48. In the embodiments of FIGS. 5, 7 and 8 the membrane 51 is configured as bellows 52. In the embodiment shown in FIG. 9 the membrane 51 is configured as flat membrane 53. The membrane 51 is in this case configured and arranged so that it hermetically seals the through-opening 49 between the surroundings and the working chamber 6.

According to the embodiment shown in FIG. 7, a compensating spring 54 can be provided to support the actuating drive 16 which compensates the actuating forces of the actuating drive 16 to control the actuator 15 or the valve member 46 so that the additional compressive forces acting on the actuator 15 are compensated. In particular, the compensating springs 54 can thus at least partially compensate for a negative pressure formed in the sorption zone 7 with respect to an atmospheric ambient pressure prevailing in the surroundings 34. The compensating spring 54 shown here is accordingly configured as a tension spring when the sorption zone pressure lies below the ambient pressure. The latter is then the case for example when water or methanol are used as working medium.

According to FIG. 8, a pre-tensioning spring 55 can additionally or alternatively be provided, by means of which the coupling element 50 is coupled to the valve member 46. By this means the valve 45 is configured as an overpressure opening valve 56 which is arranged or configured so that when the fluidic connection 13 is closed or when the connecting opening 20 is closed, above a predetermined overpressure in the sorption zone 7 relative to the phase change zone 8 and/or the ambient pressure, the fluidic connection 13 or the connecting opening 20 is opened and vapour can flow into the phase change zone 8. By this means in heating mode, in the event of a malfunction of the control device 14, an excessive pressure rise in the sorption zone 7 can be avoided. By means of the relationships between the diameter or cross-sections of membrane 51 or bellows 52 on the one hand and valve seat 47 on the other hand and by means of the dimensioning and pre-tensioning of the pre-tensioning spring 55, it can be constructively specified at which pressure differences between sorption zone 7, phase change zone 8 and surroundings 34, the valve member 46 is automatically raised from the valve seat 47 and brings above an overflow of working medium from the sorption zone 7 to the phase change zone 8. It can thus be ensured even in the event of a malfunction of process control elements that no critical pressures can build up inside the sorption module 2.

In an embodiment not shown, the safety opening function can be fulfilled by a suitably shaped elastic seal which is raised from the valve seat at a critical difference pressure between sorption zone and phase change zone whereas it is pressed more strongly into the valve seat when the difference pressure is reversed.

The operating mode of the sorption module 2 as a heat and/or cold storage device will be explained briefly hereinafter with reference to FIG. 1.

In a loaded initial state in which the highest proportion of working medium contained in the sorption module 2 is present in the phase change structure 11 in condensed form and the sorption zone 7 is largely or completely desorbed, the control device 14 is adjusted into its closed position. This prevents working medium from being able to flow from the phase change zone 8 into the sorption zone 7 following the pressure difference between the two zones 7, 8. In this initial state the sorption module 2 has both heat capacity and cold capacity so that both thermal energy and also cold energy, i.e. heat absorbing capacity, are stored therein. When used as a heat storage device and for retrieval of the stored heat, the sorption circuit 3 assigned to the sorption zone 7 is initially connected to the heat sink to be heated, e.g. to the cooling circuit of a still-cold internal combustion engine. At the desired time of a release of the stored heat the control device 14 is opened, with the result that working medium vapour flows from the phase change zone 8 to the sorption zone 7 and is absorbed by the sorption structure 9. The consequence of this is that the sorption structure 9 is heated and as a result the heat sink connected to the sorption circuit 3 is heated. In this case, the phase change structure 11 operates as an evaporator for evaporating the liquid working medium stored therein. The heat of evaporation required here can be supplied via the phase change path 12, whereby the phase change medium flowing therein is cooled and can cool a heat source to a low temperature level. The phase change path 12 thus forms a heat sink with which a heat source can be cooled simultaneously. If there is no requirement for the simultaneously released cold, the phase change circuit 4 is thermally coupled to the largest possible heat reservoir, e.g. the surroundings 34 by means of a heat exchanger.

When used as a cold storage device and for retrieval of stored "cold", the phase change circuit 4 assigned to the phase change zone 8 is initially brought in thermal contact with the heat source to be cooled, e.g. by means of a heat exchanger. At the desired time of the stored "cold", the control device 14 is opened with the result that working medium vapour flows from the phase change zone 8 to the sorption zone 7 and is adsorbed by the sorption structure 9. The consequence of this is that the sorption zone 7 is heated and as a result the heat sink connected to the sorption circuit 3 is heated. The phase change structure 11 operates as an evaporator for evaporating the liquid working medium stored therein. The heat of evaporation required here can be supplied via the phase change circuit 4, whereby the working medium flowing therein is cooled and can cool a heat source to a low temperature level. The phase change circuit 4 thus forms a heat sink with which a heat source can be cooled simultaneously. If there is no requirement for the simultaneously released adsorption heat, the sorption circuit 3 is thermally coupled to the largest possible heat reservoir, e.g. the surroundings 34 by means of a heat exchanger.

The discharging process of the heat and/or cold storage device can be performed until the entire working medium evaporates and the storage device is thus discharged.

The invention claimed is:

1. A sorption module for a sorption temperature-control device, comprising:
   a housing that encloses a working chamber that includes a sorption zone and a phase change zone arranged therein;
   a sorption structure arranged in the sorption zone and coupled in a heat-transmitting manner to a sorption path for guiding a sorption path medium;
   a phase change structure arranged in the phase change zone and coupled in a heat-transmitting manner to a phase change path for guiding a phase change path medium; and
   a control device configured to control a fluidic connection through which a working medium is reversibly displaceable between the sorption zone and the phase change zone;
   wherein the control device includes an actuator configured to cooperate with the fluidic connection such that the actuator controls the fluidic connection depending on an adjustment of the actuator; and
   wherein the control device further includes an actuating drive configured to adjust the actuator.

2. The sorption module according to claim 1, wherein the actuating drive is one of an electrically operating actuating drive and an electromagnetically operating actuating drive.

3. The sorption module according to claim 1, wherein the actuating drive is one of a pneumatically operating actuating drive and a hydraulically operating actuating drive.

4. The sorption module according to claim 1, wherein:
the actuating drive is attached to an outside face of an outer wall of the housing; and
the actuator passes through a through-opening formed in the outer wall and cooperates with the fluidic connection in the working chamber.

5. The sorption module according to claim 4, further comprising an elastic membrane connected to the actuator and the outer wall, the elastic membrane sealing the through-opening with respect to the working chamber.

6. The sorption module according to claim 1, wherein:
the housing includes a partition that fluidically separates the sorption zone from the phase change zone; and
the fluidic connection includes at least one connecting opening in the partition.

7. The sorption module according to claim 1, wherein the actuator is a valve including an adjustable valve member for controlling the fluidic connection.

8. The sorption module according to claim 7, wherein the adjustable valve member cooperates with a valve seat that borders the at least one connecting opening.

9. The sorption module according to claim 7, wherein the valve is an overpressure opening valve, which, when the fluidic connection is closed, is configured to open the fluidic connection when a pressure in the sorption zone exceeds a pre-determined overpressure relative to a pressure of at least one of the phase change zone and the surroundings.

10. The sorption module according to claim 9, wherein the overpressure opening valve includes a coupling element that is adjustable by the actuating drive, the coupling element coupled to the valve member by a pre-tensioning spring.

11. The sorption module according to claim 6 wherein:
the housing is configured to be cuboid, the sorption zone and the phase change zone arranged adjacent to one another therein; and
the partition is arranged between the sorption zone and the phase change zone.

12. The sorption module according to claim 11, wherein the partition includes a step on which the at least one connecting opening is arranged.

13. The sorption module according to claim 6, wherein:
the housing is cylindrical;
the phase change zone encloses the sorption zone annularly in a circumferential direction of the housing; and
the partition is annular and arranged radially between the sorption zone and the phase change zone.

14. The sorption module according to claim 13, wherein:
the housing includes a jacket extending in the circumferential direction and is configured to be double-walled and hollow-walled; and
wherein the phase change path is guided through the jacket.

15. The sorption module according to claim 14, wherein the phase change structure contacts, in a heat-transmitting manner, an inner side of the jacket that faces the working chamber, and the phase change structure is at a radial distance from the partition.

16. A sorption temperature-control device, comprising:
at least one sorption module including:
a housing that encloses a working chamber that includes a sorption zone and a phase change zone arranged therein;
a sorption structure arranged in the sorption zone and coupled in a heat-transmitting manner to a sorption path for guiding a sorption path medium;
a phase change structure arranged in the phase change zone and coupled in a heat-transmitting manner to a phase change path for guiding a phase change path medium; and
a control device configured to control a fluidic connection through which a working medium is reversibly displaceable between the sorption zone and the phase change zone;
wherein the control device includes an actuator configured to cooperate with the fluidic connection such that the actuator controls the fluidic connection depending on an adjustment of the actuator; and
wherein the control device further includes an actuating drive configured to adjust the actuator;
at least one sorption circuit through which the sorption path medium circulates; and
at least one phase change circuit through which the phase change path medium circulates;
wherein the sorption path is incorporated in the at least one sorption circuit and the phase change path is incorporated in the at least one phase change circuit.

17. The sorption temperature-control device according to claim 16, wherein the actuating drive operates one of electrically, electromagnetically, pneumatically, and hydraulically.

18. The sorption module according to claim 16, wherein the housing includes a partition that fluidically separates the sorption zone from the phase change zone, and wherein the fluidic connection is structured as at least one connecting opening in the partition.

19. The sorption module according to claim 16, wherein the actuator is a valve including an adjustable valve member for controlling the fluidic connection.

20. A sorption module, comprising:
a housing that encloses a working chamber that includes a sorption zone and a phase change zone arranged therein, the housing further including an outer wall having an outside face, the outer wall including a through-opening;
a sorption structure arranged in the sorption zone and coupled in a heat-transmitting manner to a sorption path for guiding a sorption path medium;
a phase change structure arranged in the phase change zone and coupled in a heat-transmitting manner to a phase change path for guiding a phase change path medium;
a control device configured to control a fluidic connection through which a working medium is reversibly displaceable between the sorption zone and the phase change zone; and
an elastic membrane;
wherein the control device includes an actuator configured to cooperate with the fluidic connection such that the actuator controls the fluidic connection depending on an adjustment of the actuator;
wherein the control device further includes an actuating drive configured to adjust the actuator, the actuating drive passing through the through-opening and cooperating with the fluidic connection in the working chamber; and
wherein the elastic membrane is connected to the actuator and the outer wall such that the through-opening is sealed with respect to the working chamber.

* * * * *